April 14, 1925.
T. A. REID
1,533,267
TEMPERATURE INDICATOR AND CONTROLLER
Filed April 18, 1922
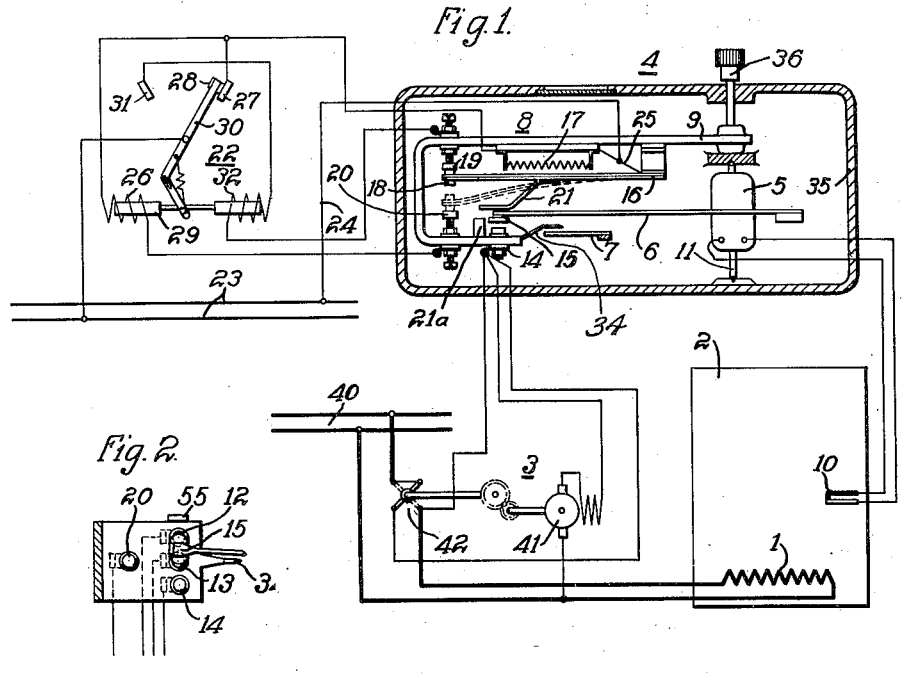
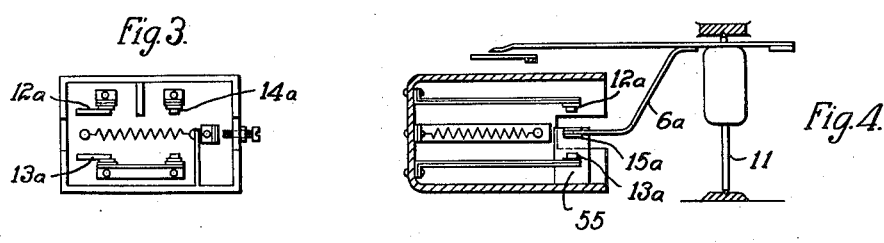
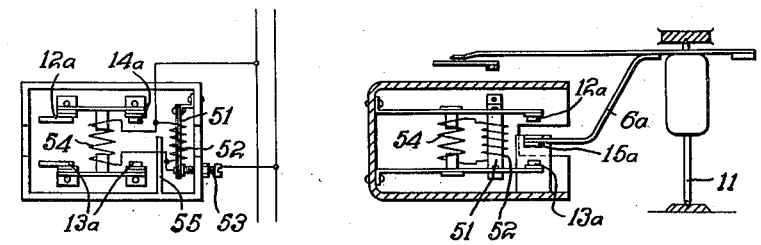
WITNESSES:
INVENTOR
Thomas A. Reid.
BY
ATTORNEY Patented Apr. 14, 1925.

1,533,267

UNITED STATES PATENT OFFICE.

THOMAS A. REID, OF PITTSBURGH, PENNSYLVANIA, ASSIGNOR TO WESTINGHOUSE ELECTRIC & MANUFACTURING COMPANY, A CORPORATION OF PENNSYLVANIA.

TEMPERATURE INDICATOR AND CONTROLLER.

Application filed April 18, 1922. Serial No. 555,514.

*To all whom it may concern:*

Be it known that I, THOMAS A. REID, a citizen of the United States, and a resident of Pittsburgh, in the county of Allegheny and State of Pennsylvania, have invented a new and useful Improvement in Temperature Indicators and Controllers, of which the following is a specification.

My invention relates to control apparatus and particularly to indicating and measuring apparatus which may be easily and economically modified to serve also to control the condition or the value of the quantity being measured.

One object of my invention is to provide means for indicating and controlling a condition or the value of a quantity.

Another object of my invention is to provide a simple and inexpensive control attachment that may be applied to a temperature-indicating apparatus to co-operate therewith to control the temperature of a furnace, or the like, with which the indicator is associated, by controlling the energy input of the furnace.

Another object of my invention is to provide a device, of the above-indicated character, that may be applied to operating indicating instruments without considerable change in the structure thereof to permit the indicating instrument to serve also as a controlling device.

A further object of my invention is to provide a contactive device that may be applied to an indicating instrument to co-operate with the indicating member or pointer thereof to periodically control the temperature of the furnace with which the indicating instrument is associated, and thereby to maintain such temperature within a predetermined range.

In practicing my invention, I provide a contactive device that may be disposed adjacent the path traversed by the indicating member, to be controlled by the indicating member within a predetermined portion of such path. The contactive device may be disposed adjacent any point of the path traversed by the indicating member and is adapted to operate periodically and to engage the indicating member within a predetermined portion of its path. The indicating member serves to complete either of two control circuits whereby the temperature of the furnace is either increased or decreased in order that the average or mean temperature may be maintained at a substantially constant value.

Figure 1 of the accompanying drawings is a diagrammatic view of a temperature-control system containing an indicating and control instrument embodying my invention;

Fig. 2 is a plan view of a portion of the indicating member and the contact members controlled thereby to control the external control circuits;

Figs. 3 and 5 are end views of two modified forms of contactive device embodying my invention, and Figs. 4 and 6 are side elevational views of the devices shown in Figs. 3 and 5, illustrating the disposition thereof relative to the indicating member, or pointer, of the instrument.

Referring to Fig. 1, the system comprises, in general, a heating element 1 for a furnace 2, or other device to be heated, a motor-operated snap switch 3 to control the energization of the heating element 1 and a temperature indicator and controller 4 whereby the temperature of the furnace 2 is maintained substantially constant.

The indicator 4 comprises, in general, a movable coil 5, and indicating member 6 controlled thereby, a calibrated scale 7 and a contactive apparatus 8 disposed on, and supported by, a supporting member or bracket 9.

The coil 5 is energized from a thermocouple 10 in accordance with the temperature of the furnace 2 and, by means of the pointer 6, indicates on the calibrated scale 7 the temperature of the thermocouple 10 and, therefore, of the furnace 2.

The contactive device 8 comprises a plurality of contact members 12, 13 and 14 that are adapted to be periodically engaged by a bridging contact member 15 when the bridging member, which is disposed on, and supported by, the indicating member 6, is brought into that portion of its path which is adjacent the contact members 12, 13 and 14. The engagement of the contact members 12 and 13, or the contact members 13 and 14, by the bridging contact member 15, is periodically effected by a thermally-responsive bimetallic member 16 which is periodically heated and actuated by a heating element 17.

The bimetallic element 16 carries a contact member 18 that is adapted to engage an adjustable contact member 19 in the normal position of the bimetallic element 16, and to engage a second contact member 20 in the operated condition of the bimetallic member 16. When the bimetallic element is heated sufficiently to effect engagement between its contact member 18 and the stationary contact member 20, the bridging contact member 15 is caused to engage either the contact members 12 and 13, or the contact members 13 and 14, by a depressing member 21 that is carried by the bimetallic member 16, providing the indicating member is within the predetermined control region. It will be noted that the width of the bridging member should be less than the distance between the inner edges of the contact members 12 and 14 to preclude simultaneous engagement of all the contact members 12, 13 and 14.

A stop 21ª is provided for the depressing member 21 to prevent that member from engaging the contact members 12, 13 and 14 when it is moved downwardly by the bimetallic member 16 while the bridging member 15 is not within the predetermined control region.

When the instrument is employed to control the temperature of a furnace or the like, changes in the temperature thereof will normally be too slow to permit the indicating member 6, and the bridging member 15 controlled thereby, to move beyond the limits of the region controlled by the instrument before the contactive device 8 may operate to engage the bridging member 15. When the instrument is employed, however, to control an external condition or value that may change quickly, it is necessary to provide means to maintain the bridging member within the sphere of influence or control of the contactive device.

A maximum-position stop member 55 may, therefore, be provided to preclude movement of the indicating member beyond the maximum value of the control region. In addition the minimum-position contact member 14 is extended farther down the range of the instrument to increase the region of control of the contactive device for the minimum value. Thus, if the condition, or the value of the quantity, that is to be maintained substantially constant, should change beyond the limits of the predetermined region, within which such condition or quantity is to be maintained, before the operation of the contactive device, the stop member at the maximum position and the extended minimum-position contact member will permit the contactive device to be effective in controlling the apparatus to control such condition or quantity to correspond to a predetermined condition or value.

The periodic energization of the heating element 17 to effect a correspondingly periodic operation of the bimetallic element 16 is controlled by a transfer relay 22. Thus, when the bimetallic member 16 is in its normal position at which the contact members 18 and 19 are engaged, the transfer relay 22 is actuated to the position that is illustrated, to connect the heating element 17 to an energizing circuit 23. The heating element 17 is thereupon energized to heat the bimetallic element 16 and engagement is subsequently effected between the contact members 18 and 20. A circuit is thereupon completed thereby, from the energizing circuit 23 through conductor 24, conductor 25, bimetallic element 16, contact members 18 and 20, the operating coil 26 of the transfer relay 22 and the contact members 27 and 28 back to the energizing circuit 23. The coil 26 is thereupon energized to actuate a core member 29 to its left-hand position whereupon the contact member 28 is actuated by a pivoted member 30 to engage the other stationary contact member 31.

When the contact members 28 and 27 are disengaged, the circuit through the heating element 17 is opened and the bimetallic member 16, being no longer heated thereby, gradually dissipates its heat and returns to its initial position at which the contact member 18 engages the contact member 19. A circuit is thereupon completed to energize the operating coil 32 of the transfer relay 22, whereupon the transfer relay is again actuated to the position illustrated in the drawing and the heating element 17 is re-energized to effect the operation of the bimetallic member 16.

The circuit for energizing the operating coil 32 may be traced from the energizing circuit 23 through conductors 24 and 25, bimetallic member 16, the contact members 18 and 19, and the operating coil 32 and the contact members 31 and 28 of the transfer relay 22, back to the energizing circuit 23.

The bimetallic member 16 with its heating element 17, the contact members 19 and 20, that are adapted to be engaged thereby, and the contact members 12, 13 and 14 are all mounted on, and supported by, the supporting member or bracket 9. The lower end of the bracket 9 is disposed adjacent the scale 7 and is provided with a pointer 34 to indicate thereon the temperature at which the heat of the furnace is to be maintained.

The supporting member 9 and the contactive device supported thereby are disposed within a casing 35 within which the indicating mechanism is enclosed. The position of the contact members 12, 13 and 14 relative to the scale 7 may be adjusted by moving the supporting member 9 by means of an adjustable knob 36 extending through the casing 35. The axis of the knob 36 is aligned with the axis of the movable coil 5 in order that the contact members 12, 13 and 14 may be disposed adjacent the arc traversed by the bridging contact member 15, that is supported on, and controlled by, the indicating member 6.

The depressing member 21 may be sufficiently offset from the bimetallic element 16 to permit the heating element 17 and the corresponding portion of the supporting member 9 to be disposed beyond the corresponding portion of the scale 7, in order that observation may be made of the movements of the indicating member 6.

The period, or interval of operation, of the bimetallic element 16 may be controlled by adjusting the positions of the contact members 19 and 20 to either increase or decrease the distance which must be traversed by the contact member 18 before the heating element 17 may be reenergized. Although the bimetallic member 16 will be periodically actuated, engagement of the contact members 12, 13 and 14 by the bridging member 15 will be effected only when the temperature of the furnace attains such value that the indicating member 6 is moved into that portion of its path that is included between the contact members 12 and 14.

Assuming the temperature to exceed slightly the temperature at which the furnace is to be maintained, engagement will be effected between the contact members 12 and 13, whereupon the motor-operated snap switch 3 will be actuated to the position that is illustrated in the drawing, to disconnect the heating element 1 from its source of energy 40. As the temperature of the furnace decreases, the contact members 13 and 14 will be bridged by the contact member 15 and a circuit completed through the motor 41 and a snap switch 42. The switch 42 will thereupon be actuated by the motor to its other position to reconnect the heating element 1 to its source of energy 40 and to open the circuit of the motor 41.

As the temperature again increases, engagement will be again effected between the contact members 12 and 13 to complete the circuit of the motor through the switch 42, as shown in the broken-line position. The snap switch 42 will thereupon be actuated to open the circuit of the heating element 1 and also of the motor 41. The temperature of the furnace is then maintained substantially constant at the value at which the pointer 34 is set relative to the scale 7. It is readily obvious that the range of temperature, within which the temperature of the furnace may be maintained, may be rendered relatively small in accordance with the sensitivity of the indicating instrument that is employed.

In order to preclude the establishment of a side thrust against the shaft 11 upon which the movable coil 5 is disposed, and also to preclude the establishment of a couple of distorting forces either in the indicating member or in the shaft 11, a contactive device of such construction as is illustrated in Figs. 3 and 4, may be employed to effect periodic engagement of the bridging contact member 15 without setting up forces in the indicating member, and thus tending to produce a side thrust or distorting force in the shaft 11.

With the arrangement that is illustrated in Figs. 3 and 4, the indicating instrument is provided with an auxiliary indicator, or contact bearing member, 6$^a$, that is adapted to pass between two contact members 12$^a$ and 14$^a$ that are supported on, and controlled by, bimetallic members, and a plurality of contact members 13$^a$ that are similarly supported on, and controlled by, another bimetallic member. The bimetallic members controlling contact members 12$^a$ and 14$^a$ move downwardly relative to their positions shown in Figs. 3 and 4, while the contact members 13$^a$ are moved upwardly to effect engagement with the contact member 15$^a$. These bimetallic members are periodically heated and actuated in the same manner as was previously explained in connection with the heating element 17 and the bimetallic elements 16 that are illustrated in Fig. 1, and periodic engagement of the contact member 15$^a$ is thus effected. By means of such an arrangement, all distorting forces on the indicating member 6 and on the shaft 11 are eliminated.

The contact members 12$^a$, 13$^a$ and 14$^a$ are provided with portions extending, respectively, in planes parallel to the plane in which the indicating member moves. Thus, the contact members 12$^a$ and 13$^a$ will engage the contact member 15$^a$ although the indicating member may move beyond the predetermined region of control before an operation of the contactive device to control the external apparatus to change the controlled condition or quantity to effect a movement of the indicating member in the opposite direction. A stop member 55 may be disposed somewhat beyond the contact members 13$^a$ and 14$^a$ to preclude movement of the contact member 15$^a$ beyond them.

In Figs. 5 and 6 is illustrated another form of device that may be employed to effect direct engagement of the contact members by the bridging member supported on the auxiliary indicating member without impressing a distorting force on the indicating member or the shaft. A bimetallic element 51 is secured at one of its ends and provided with a heating element 52, the circuit of which is periodically opened and closed by the bimetallic member 51 in conjunction with an adjustable contact member 53. When the bimetallic element 51 becomes heated, it disengages the contact member 53 and, after dissipating the heat stored therein and again cooling, it re-engages the contact member 53, thereby completing the circuit of the heating element 52 and also the circuit of an operating solenoid 54. The solenoid 54 controls a pair of armatures, one of which is carried by mountings for the contact members 12ᵃ and 14ᵃ, and 13ᵃ, respectively.

The solenoid 54, when energized, effects positive engagement of the contact member 15ᵃ by the contact members 12ᵃ and 13ᵃ, or 13ᵃ and 14ᵃ, depending upon the position of the contact member 15ᵃ relative thereto. By means of a device of this character, a more positive engagement of the contact members may be effected than with either of the other two forms that are illustrated.

It will be observed that, by applying a relatively simple, inexpensive and rugged contactive device to a relatively sensitive indicating instrument, an inexpensive combination indicating and controlling device may be obtained. The prime importance of the device which I have illustrated resides in the application of a relatively inexpensive control attachment to a sensitive indicating instrument to provide a simple and inexpensive controller for controlling the temperatures of electric furnace, or the like.

Although I have described a particular application of the modified instrument in connection with a temperature-controlling system, it is readily obvious that an instrument of such character may be employed to maintain any other predetermined condition or quantity substantially constant by employing the instrument as an auxiliary controller for the main control equipment that is employed to maintain the aforementioned condition or quantity at a predetermined value.

Although I have shown several forms of the device embodying my invention, it is obvious that other modifications may be made therein without departing from the spirit and scope of my invention, as set forth in the appended claims.

I claim as my invention:

1. In a temperature-controlling system for an electrically-heated device, the combination with a heat-developing device, a source of energy therefor and means for controlling the admission of energy to the heat developing device, of a controlling means for the energy-controlling means comprising a member movable in response to the temperature of the heated device, contact members disposed in predetermined relation with respect to the path thereof to be engaged by the movable member at predetermined temperatures corresponding to the positions of the contact members, and thermoresponsive means for periodically causing the movable member to engage one of the contact members while said movable member is within the range of the path included by the contact members.

2. In a temperature-controlling system for an electrically-heated device, the combination with a heat-developing device, a source of energy therefor and means for controlling the admission of energy to the heat-developing device, of a controlling means for the energy-controlling means comprising a member movable in response to the temperature of the heated device, circuit-controlling means co-operating with the movable member and disposed in predetermined relation with respect to a portion of the path of the movable member corresponding to a predetermined range of temperature within which the heated device is to be maintained, and thermoresponsive means periodically operable to effect the co-operation of the movable member with one of the circuit-controlling means disposed at a point corresponding substantially to the temperature of the heated device.

3. A temperature indicator and controller for an electric furnace or the like, comprising an element movable in accordance with the temperature of the furnace to indicate such temperature, means adapted to co-operate with the movable member to control external means for maintaining the temperature of the furnace within a predetermined range, and means comprising a bimetallic strip for periodically effecting such co-operation.

4. A temperature indicator and controller for an electric furnace or the like, comprising an indicating member movable in accordance with the temperature of the furnace, means adapted to be controlled by the movable member for controlling external means to maintain the temperature of the furnace within predetermined limits, means for controlling the effectiveness of the movable member in controlling the external controlling means, and means dependent upon its condition for controlling the operation thereof.

5. A temperature indicator and controller comprising a casing, an indicating member disposed therein and movable in accordance with an external temperature being measured, a graduated scale and a window adjacent thereto in the casing, a plurality of circuit-controlling devices to be controlled by the indicating member and means extending through the casing to control the position of the circuit-controlling devices the indicating member, the circuit-controlling devices and the externally-extending controlling means being in axial alinement.

6. The combination with an indicating instrument disposed in a casing and provided with a movable indicating member and a calibrated scale therefor, of a plurality of contact members for external circuits, a supporting member therefor adjustable from the outside of the instrument casing to dispose the contact members in a predetermined position relative to a predetermined portion of the path of the indicating member and bimetallic theremoresponsive means for rendering the indicating member effective to control the circuits including the contact members.

7. The combination with an indicating instrument disposed in a casing and provided with a movable indicating member and a calibrated scale therefor, of a plurality of contact members for external circuits, a supporting member therefor adjustable from the outside of the instrument casing at a point in axial alinement with the axis of the indicator and movable both in a plane parallel to the plane in which the indicating member moves and about an axis concentric with the axis about which the movable indicating element moves, to dispose the contact members in a predetermined position relative to a predetermined portion of the path of the indicating member.

8. The combination with an indicating instrument disposed in a casing and provided with a movable indicating member and a calibrated scale therefor, of a plurality of contact members for external circuits, a supporting member therefor adjustable from the outside of the instrument casing at a point in substantially axial alinement with the axis of the indicator and movable both in a plane parallel to the plane in which the indicating member moves and about an axis concentric with the axis about which the movable indicating element moves, to dispose the contact members in a predetermined position relative to a predetermined portion of the path of the indicating member, and means periodically operative to cause the indicating member to control the electrical relation of the several contact members.

9. A regulating device for controlling an extenral condition or quantity, comprising a member movable in accordance with the degree or value of such condition or quantity, circuit-controlling means adapted to control external apparatus for varying said condition or quantity, and means thermoresponsive independently and periodically operative for effecting periodic control of the circuit-controlling means while the movable member is within a predetermined range of its travel.

10. The combination with an indicating instrument embodying a movable indicating member, of means disposed adjacent a predetermined portion of the path traversed by the indicating member for controlling an external circuit, and means for effecting the control of the circuit-controlling means by the indicating member, comprising a thermoresponsive member movable to effect contactive engagement of the circuit-controlling means by the indicating member, electrically-energized means for developing the actuating thermal force for said movable member and means for rendering the development of such actuating force periodic.

11. In an indicating and controlling instrument, the combination with an indicating member supported on a shaft disposed between two bearings, of a contactive device adapted to periodically engage the indicating member and means for precluding the development of a couple of forces between the portions of the shaft disposed in the bearings.

12. In an indicating and controlling instrument, the combination with an indicating member supported on a shaft disposed between two bearings, of a contactive device adapted to periodically engage the indicating member and means for precluding a side thrust on the shaft supporting the indicating member.

13. In an indicating and controlling instrument, the combination with an indicating member supported on a shaft disposed between two bearings, of a contactive device adapted to periodically engage the indicating member within a predetermined portion of its path, and means for perpendicularly actuating the contactive device against opposite sides of the indicating member to preclude the development of a side thrust against the shaft supporting the indicating member.

14. In an indicating and controlling instrument, the combination with a movable indicating member, of a contactive device for engaging the indicating member perpendicularly to its plane of movement, and means cooperating with the contactive device to preclude the development of a couple of forces between two points of the indicating member.

15. In an indicating and controlling instrument, the combination with a movable indicating member, of a contactive device for engaging the indicating member perpendicularly to its plane of movement, and means periodically electro-thermally actuated for controlling such engagement.

16. In an indicating and controlling instrument, the combination with a movable indicating member, of a contactive device for engaging the indicating member perpendicularly to its plane of movement, and electro-thermal means for controlling such engagement.

17. In an indicating and controlling instrument, the combination with a movable indicating member, of a contactive device for engaging the indicating member perpendicularly to its plane of movement, and an electro-responsive member thermally controlled for controlling such engagement.

18. In an indicating and controlling instrument, the combination with a movable indicating member, of a contactive device for engaging the indicating member perpendicularly to its plane of movement, means periodically actuated to effect such engagement, and auxiliary means for controlling the periodic actuation of the engagement-effecting means.

19. In an indicating and controlling instrument, the combination with a movable indicating member, of a contactive device for engaging the indicating member perpendicularly to its plane of movement, means periodically actuated to control said engagement, and means controlled by said means for controlling the periodic actuation thereof.

20. In an indicating and controlling instrument, the combination with a movable indicating member, of a contactive device for engaging the indicating member perpendicularly to its plane of movement, means for periodically effecting such engagement and means for controlling said means.

21. In an indicating and controlling instrument, the combination with a movable indicating member, of a contactive device for engaging the indicating member perpendicularly to its plane of movement, and means for controlling such engagement comprising a movable member, means for effecting the actuation of the movable member when electrically energized and means for periodically energizing said acutuating means.

22. In an indicating and controlling instrument, the combination with a movable indicating member, of a contactive device for engaging the indicating member perpendicularly to its plane of movement, means co-operating with the contactive device to preclude the development of a couple of distorting forces in the indicating member, means for effecting the operation of the contactive device and means for rendering such means periodic in its operation.

23. The combination with an indicating instrument, provided with a movable indicating member, of a contactive device for controlling an external circuit, and means for effecting co-operation between the indicating member and the contactive device to control said external circuit comprising a controlling member, means energized to effect the actuation thereof, a switch for controlling the energization of said actuation-effecting means and means controlled by the controlling member for controlling the operation of the controlling switch.

24. In a measuring and controlling device, the combination with a movable indicating member, of a contactive device for controlling external apparatus comprising a plurality of contact members extending in a plane parallel to the plane of movement of the indicating member and means comprising a bimetallic strip for effecting engagement of the contact members by the indicating member.

25. In a measuring and controlling device, the combination with a movable indicating member, of a contactive device for controlling external apparatus comprising a plurality of contact members, and means controlled by the indicating member for controlling the contactive device.

26. In a measuring and controlling device, the combination with a movable indicating member, of a contactive device for controlling external apparatus comprising a plurality of contact members, and means supported on and controlled by the indicating member for controlling the operation of the contact member to control the external apparatus.

27. The combination with an indicating instrument embodying a movable indicating member, of means disposed adjacent a predetermined portion of the path traversed by the indicating member for controlling an external circuit, and means for effecting the control of the circuit-controlling means by the indicating member, comprising a bimetallic thermoresponsive movable member to effect contactive engagement of the circuit controlling means by the indicating member, and means co-operating with the movable member for controlling the development of the actuating thermal force for the movable member.

28. The combination with an indicating instrument embodying a movable indicating member, of means disposed adjacent a predetermined portion of the path traversed by the indicating member for controlling an external circuit, and means for effecting the control of the circuit-controlling means by the indicating member, comprising a bimetallic thermoresponsive movable member to effect contactive engagement of the circuit controlling means by the indicating member, and circuit controlling means co-operating with the movable member for controlling the development of the actuating thermal force for the movable member.

In testimony whereof, I have hereunto subscribed my name this 11th day of April, 1922.

THOMAS A. REID.